US012730887B2

(12) United States Patent
Habouzit et al.

(10) Patent No.: US 12,730,887 B2
(45) Date of Patent: Sep. 8, 2026

(54) PROCESSOR INSTRUCTION FOR SECURE POINTER ARITHMETIC

(71) Applicant: Apple Inc., Cupertino, CA (US)

(72) Inventors: Pierre Habouzit, Triel sur Seine (FR); Michael D. Snyder, Cedar Park, TX (US); Jeff Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/797,377

(22) Filed: Aug. 7, 2024

(65) Prior Publication Data

US 2025/0209160 A1 Jun. 26, 2025

Related U.S. Application Data

(60) Provisional application No. 63/614,252, filed on Dec. 22, 2023.

(51) Int. Cl.
*G06F 21/55* (2013.01)
*G06F 9/30* (2018.01)

(52) U.S. Cl.
CPC .......... *G06F 21/554* (2013.01); *G06F 9/3001* (2013.01); *G06F 2221/034* (2013.01)

(58) Field of Classification Search
None
See application file for complete search history.

(56) References Cited

U.S. PATENT DOCUMENTS

2013/0024631 A1* 1/2013 Balasubramanian ..... G06F 9/30 711/E12.001
2013/0054546 A1* 2/2013 Solihin ............... G06F 12/0223 707/693
2015/0106588 A1 4/2015 Godard et al.
2021/0286755 A1 9/2021 Vorbach
2022/0342830 A1 10/2022 Chen et al.

FOREIGN PATENT DOCUMENTS

CN 105849690 A 8/2016
JP 2006-031363 A 2/2006
TW I438683 B 5/2014

OTHER PUBLICATIONS

Arm, “Armv8.5-A Memory Tagging Extension,” pp. 1-9, May 31, 2021, https://developer.arm.com/documentation/102925/latest/.
International Search Report and Written Opinion in PCT Appl. No. PCT/US2024/061123 mailed Apr. 16, 2025, 10 pages.

* cited by examiner

*Primary Examiner* — William J. Goodchild
(74) *Attorney, Agent, or Firm* — Kowert, Hood, Munyon, Rankin & Goetzel, P.C.; Scott W. Pape; Dean M. Munyon

(57) ABSTRACT

An apparatus includes a processor circuit with an execution pipeline circuit configured to execute instructions within an instruction stream, including a first instance of an instruction executable to compute an address to access a data array. The first instance of the instruction may specify a set of operands that includes a pointer to a base address of the data array, an index into the data array, and a size of data elements within the data array. In response to receiving the first instance of the instruction, the execution pipeline circuit may be configured to perform an arithmetic operation that includes a multiplication of the index and the size to generate a result for the address. In response to the arithmetic operation generating an overflow condition, the execution pipeline circuit may be further configured to cause a first corrective action that prevents access to the data array.

20 Claims, 7 Drawing Sheets

400

Figure 4:
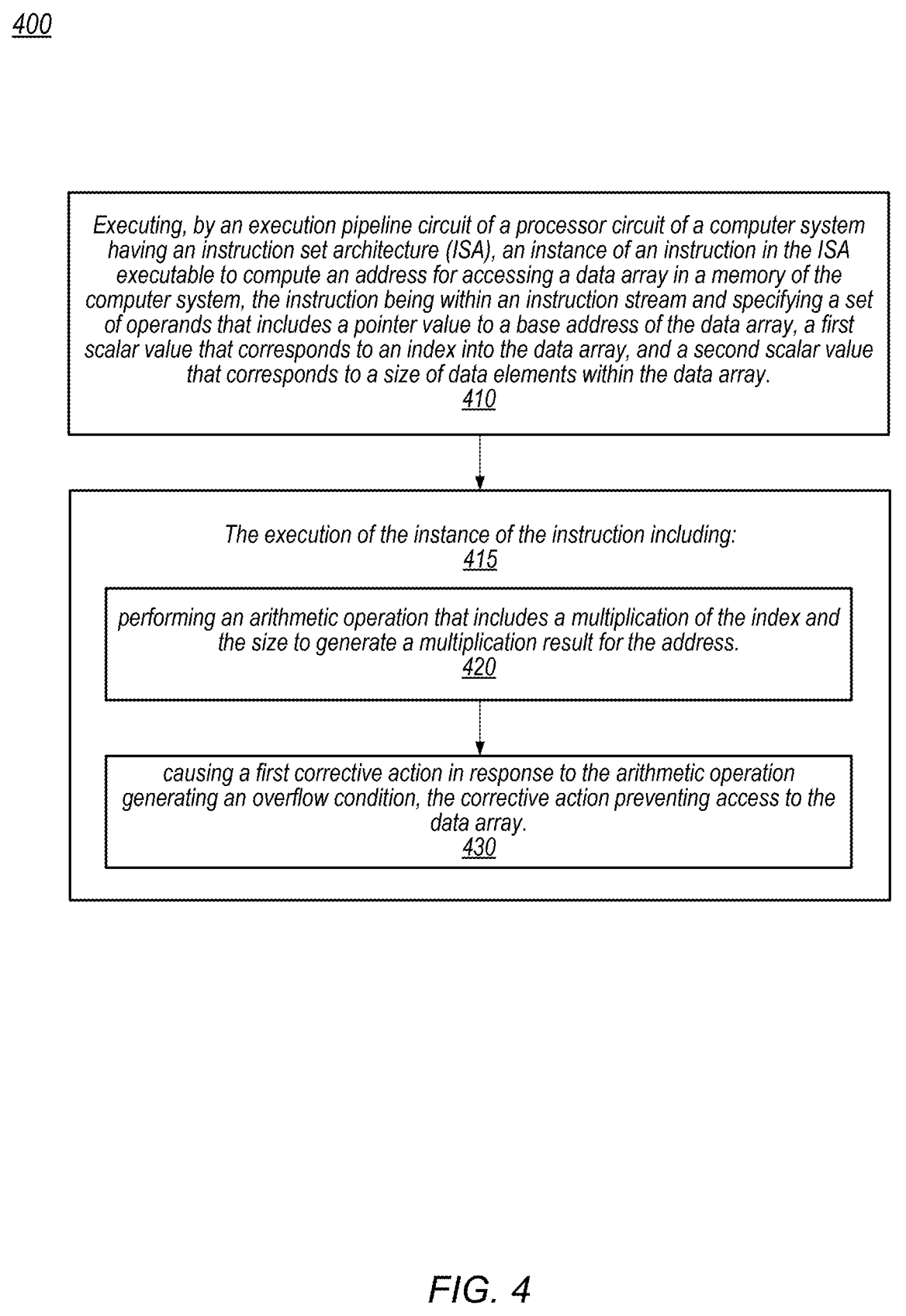

400

Executing, by an execution pipeline circuit of a processor circuit of a computer system having an instruction set architecture (ISA), an instance of an instruction in the ISA executable to compute an address for accessing a data array in a memory of the computer system, the instruction being within an instruction stream and specifying a set of operands that includes a pointer value to a base address of the data array, a first scalar value that corresponds to an index into the data array, and a second scalar value that corresponds to a size of data elements within the data array.
410

The execution of the instance of the instruction including:
415 performing an arithmetic operation that includes a multiplication of the index and the size to generate a multiplication result for the address.
420 causing a first corrective action in response to the arithmetic operation generating an overflow condition, the corrective action preventing access to the data array.
430

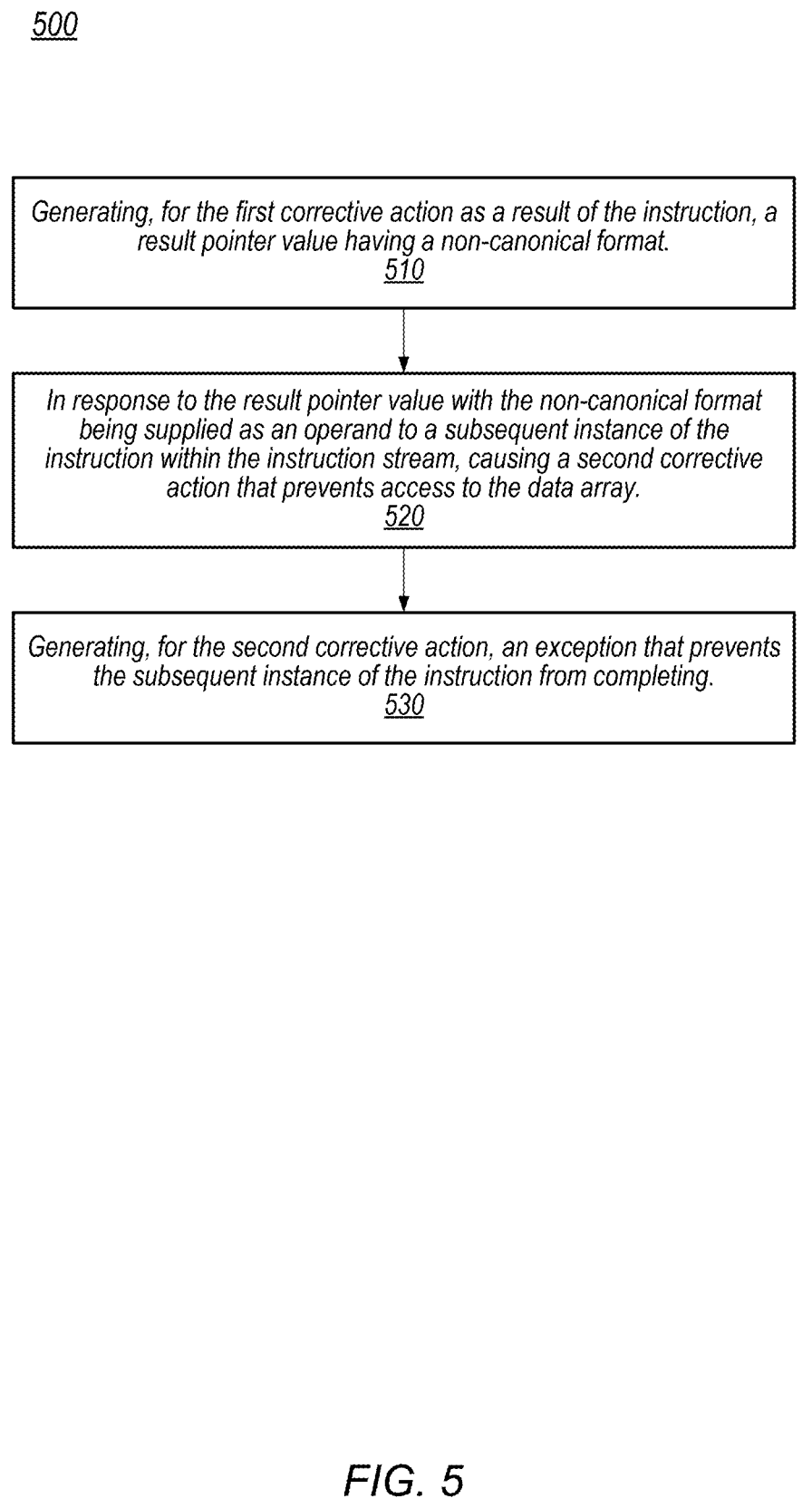

Generating, for the first corrective action as a result of the instruction, a result pointer value having a non-canonical format.
510

In response to the result pointer value with the non-canonical format being supplied as an operand to a subsequent instance of the instruction within the instruction stream, causing a second corrective action that prevents access to the data array.
520

Generating, for the second corrective action, an exception that prevents the subsequent instance of the instruction from completing.
530

FIG. 5

PROCESSOR INSTRUCTION FOR SECURE POINTER ARITHMETIC

The present application claims priority to U.S. Provisional App. No. 63/614,252, entitled "Processor Instruction for Secure Pointer Arithmetic," filed Dec. 22, 2023, the disclosure of which is incorporated by reference herein in its entirety.

BACKGROUND

Technical Field

Embodiments described herein are related to computer systems, including systems-on-a-chip (SOCs) and multi-die packages. More particularly, the disclosed embodiments are directed towards methods for performing arithmetic when generating pointers to securely access memory locations.

Description of the Related Art

Computer systems, such as systems-on-chip (SOCs), generally include one or more processors that serve as central processing units (CPUs) for a system, along with various other components such as memory controllers and peripheral components. Memories are frequently used in SOCs to store data structures that may be used by one or more applications. Corruption of a data structure in memory may, in some cases, result in improper operation of an application that is reading from the data structure. The improper operation, in turn, may provide an opportunity for a different application to gain control and/or access forbidden portions of the computer system. Accordingly, memory system attacks are a particular type of attack that a hacker may utilize in an attempt to gain control of a computer system.

BRIEF DESCRIPTION OF THE DRAWINGS

The following detailed description makes reference to the accompanying drawings, which are now briefly described.

FIG. 4 illustrates a flow diagram of an embodiment of a method for executing a particular pointer arithmetic instruction.

FIG. 5 shows a flow diagram of an embodiment of a method for generating corrective actions after a particular pointer arithmetic instruction results in an overflow condition.

Figure 1:
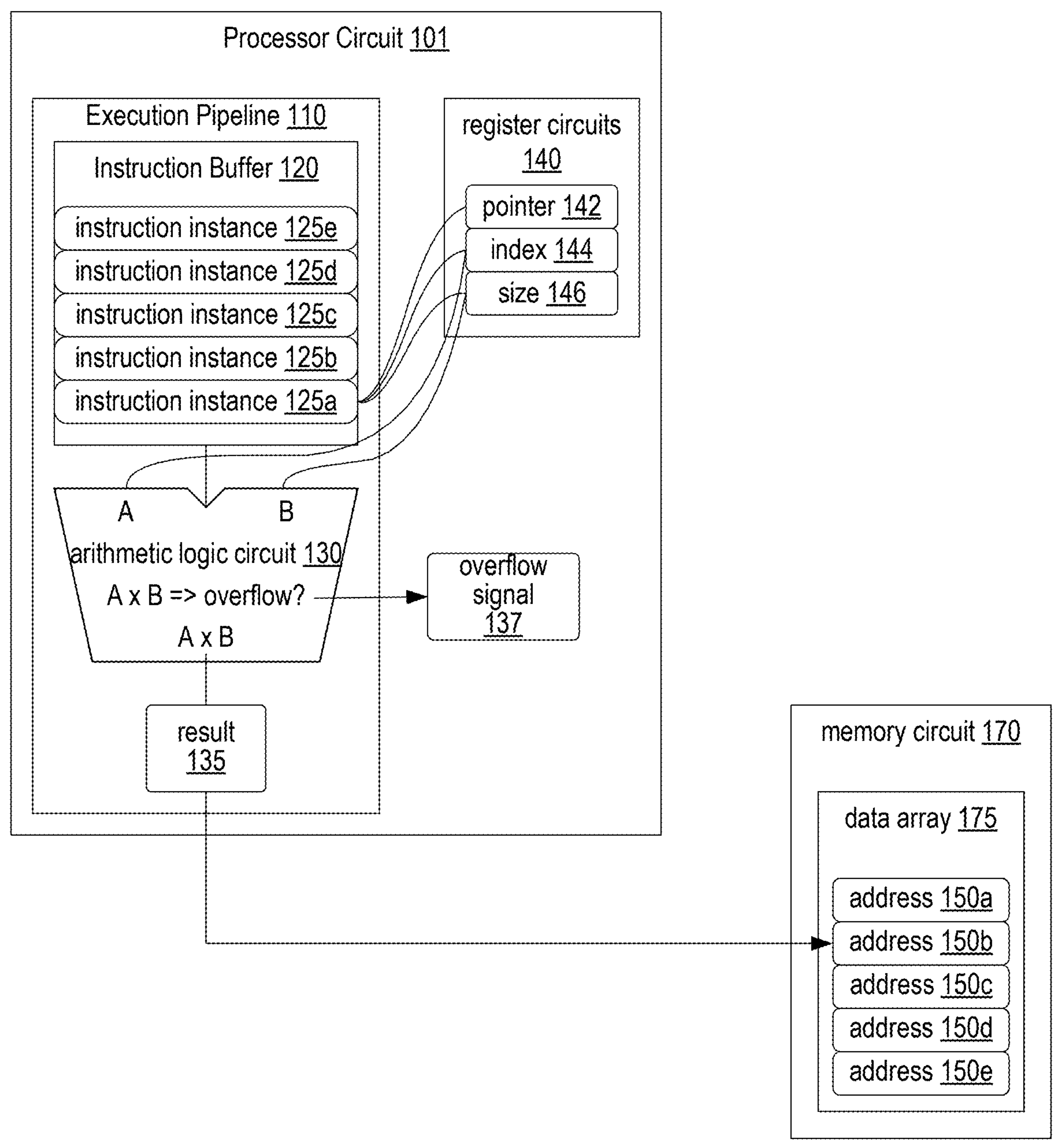
FIG. 1 illustrates a block diagram of an embodiment of a system that includes an execution pipeline that supports pointer arithmetic operations.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described, a hacker may attempt to gain access into a computer system using a memory attack. One particular type of memory attack involves pointer arithmetic. Applications commonly use a pointer to access a plurality of successive entries in a data array. If each array entry is the same size, then a program may read or write a series of entries by setting a pointer to a base address of the array and repeatedly incrementing (or decrementing in some embodiments) the pointer with the entry size. A single entry anywhere in the array may be accessed by multiplying an array index value times the entry size and adding the multiplication result to a base address of the array. Hackers may, therefore, attempt to corrupt a data array by feeding in an excessively large index value that results in an overflow condition when multiplied by the size. This overflow condition may cause the multiplication operation to generate a value that, when added to the base address, does not correspond to the intended boundaries of individual entries within the data array.

As used herein, an "overflow condition" occurs when two or more numbers are used in an arithmetic operation and the result of the operation is a value that includes more data bits than a result register has. For example, a 64-bit register can hold an unsigned integer with a maximum value of 18,446,744,073,709,551,615 or signed integer with a maximum value of 9,223,372,036,854,775,807. Accordingly, an index value that approaches, but does not exceed, these maximum values may generate an overflow condition even when used with small array entry sizes.

When such an overflow condition occurs, a truncated result may be placed into the result register, with the result not aligning with a multiple of the array entry size. Adding this misaligned value to a base address pointer, may then result in an array pointer that is misaligned to the array entries. A read access may then span from a bottom portion of a first entry and into a top portion of a second entry, resulting in retrieval of corrupted data. Similarly, a write access may overwrite a bottom portion of the first entry and a top portion of the second entry, thereby corrupting both entries. In either case, subsequent usage of the corrupted data may cause unexpected operation of an application and subsequently, unexpected operation of the computer system, thereby providing the hacker with an opportunity to gain access and/or control over some or all operations of the computer system.

The hacker may introduce the particular value via use of malicious software, often referred to as "malware," included in a seemingly harmless application, such as a game or utility. When the "infected" application is launched, the malware is also launched and may remain active in the background even after the infected application is terminated. The malware may attempt the memory attack, for example, via one or more program calls to an application program interface (API) that is provided by an operating system of the computer system and/or by other software executing in the computer system. One or more variables that are passed to the API may be known or suspected to be related to an array index value or an array entry size.

The disclosed embodiments address systems and methods for reducing an effectiveness of such pointer arithmetic memory attacks. For example, a proposed embodiment includes use of a particular instruction that specifies a set of operands used to generate a pointer value. An execution pipeline that is configured to execute the particular instruction may perform an arithmetic operation on two of the specified operands. In response to the arithmetic operation resulting in an overflow condition, the execution pipeline causes a corrective action that includes preventing use of the result as a pointer into a data array.

FIG. 1 illustrates a block diagram of an embodiment of a system, such as a system-on-chip (SOC). As illustrated, system 100 includes processor circuit 101 coupled to memory circuit 170. Processor circuit 101 includes execution pipeline 110 and register circuits 140. Furthermore, execution pipeline 110 includes instruction buffer 120 and arithmetic logic circuit 130. System 100 may be, in whole or in part, a computing system, such as a desktop or laptop computer, a smartphone, a tablet computer, a wearable smart device, or the like. In some embodiments, system 100 is a single IC, such as a system-on-chip, while in other embodiments, system 100 may include multiple die co-packaged as a single chip.

Memory circuit 170, as shown, may be implemented using any suitable type of memory cells including volatile memory, non-volatile memory, and combinations thereof. Memory circuit 170 may include one or more memory management controllers and may include memory circuits, such as, static random-access memory (SRAM), as well as dynamic random-access memory (DRAM) and/or non-volatile memories such as flash memory. In some embodiments, memory circuit 170 may include interfaces for accessing separate DRAM and/or flash memory devices. As an example, memory circuit 170 may include SRAM, a first memory controller circuit for accessing DRAM, and a second memory controller for accessing flash memory. Program instructions and various types of data files may be stored in the flash data for long-term storage, such as when system 100 is powered down. During a boot process, an operating system and one or more applications may be launched, including copying at least some of the instructions and related information into DRAM and/or SRAM for faster access by processor circuit 101.

As illustrated, data array 175 is a one-dimensional array including a plurality of entries located at addresses 150*a*-150*e* (collectively 150). In some embodiments, data array 175 may defined as a multidimensional array, using two or more index values to identify a particular entry of the array. For example, a two-dimensional array may include a row index and a column index, while a three-dimensional array may include row, column, and depth indices. Memory circuits are typically addressed using a linear address scheme in which locations may range, for example, from an address zero to an address X−1, where X is the total number of words included in the memory circuit. Accordingly, converting from two or more indices to an address includes multiplying the indices together to get a single index and then multiplying the resulting index by a size on a single array element.

As illustrated, processor circuit 101 may include one or more processor cores, each including a respective execution pipeline, such as execution pipeline 110. Processor circuit 101 may be configured to implement any suitable instruction set architecture (ISA), such as, e.g., ARM™, PowerPC®, Blackfin®, or x86 ISAs, or combination thereof. Processor circuit 101 as shown, is further configured to implement at least one additional instruction, including a particular instruction that is executable to compute an address to access a data array in a computer memory, such as data array 175 stored in memory circuit 170. Using the particular instruction, processor circuit 101 may generate read and write requests for addresses in memory circuit 170.

Execution pipeline 110, as shown, may be configured to execute instructions within an instruction stream. Instruction buffer 120 is configured to hold a stream of instructions, such as instruction instances 125*a*-125*e* (collectively 125). Instruction instances 125 may be any suitable combination of instructions from a supported ISA and include at least one instance of the particular instruction. For example, instruction instance 125*a* is depicted as a first instance of the particular instruction. Accordingly, instruction instance 125*a* is executable to compute an address to access data array 175 in memory circuit 170. Instruction instance 125*a* specifies a set of operands that includes a pointer value to a base address of the data array (pointer 142), a first scalar value that corresponds to an index into the data array (index 144), and a second scalar value that corresponds to a size of data elements within the data array (size 146). As shown, this set of operands is stored in register circuits 140, which may be implemented as SRAM, latching circuits, or any other suitable type of data storage circuit. To specify a particular operand, instruction instance 125*a* may be defined to encode an identifier of a register containing the particular operand. In other embodiments, register circuits 140 may include pointers to locations in memory circuit 170 or other memory circuits that store the values for the specified operands. Moreover, instruction instance 125*a* may include the specified operands in combination with the opcode for instruction instance 125*a*.

In response to receiving instruction instance 125*a*, execution pipeline 110 may be configured to perform an arithmetic operation that includes a multiplication of index 144 and size 146 to generate a multiplication result 135 for the address to access in data array 175. In some embodiments, result 135 may be stored in one of register circuits 140, such as replacing any of pointer 142, index 144, or size 146. In other embodiments, arithmetic logic circuit 130 may store result 135 in a different register in register circuits 140. In various embodiments, result 135 may be sent directly to a load-store unit or other execution unit in execution pipeline 110.

Execution pipeline 110 may use arithmetic logic circuit 130 to perform one or more arithmetic operations using the set of operands, including a multiplication of index 144 by size 146. Arithmetic logic circuit 130 may, for example, be an arithmetic logic unit configured to perform various integer arithmetic. In some embodiments, arithmetic logic circuit 130 may be included within a larger execution unit in execution pipeline 110, such as a load-store unit configured to generate memory transactions for accessing memory circuit 170 and/or other memory circuits in system 100.

Instruction instance 125*a* may be any suitable type of instruction that includes an arithmetic operation involving two or more of the set of operands, the result of which may be usable as a pointer to a memory location. In some embodiments, instruction instance 125*a* may be a multiply-add instruction in which the arithmetic operation includes adding multiplication result 135 to pointer 142. In other embodiments, instruction instance 125*a* may be a multiply-subtract instruction in which the arithmetic operation includes subtracting multiplication result 135 from pointer 142. In further embodiments, instruction instance 125*a* may be a load or store instruction that includes performing an arithmetic operation involving two or more of the set of operands to determine a pointer to a memory location.

In response to the arithmetic operation generating an overflow condition, execution pipeline 110 may be further configured to cause a first corrective action that prevents access to data array 175. For example, arithmetic logic circuit 130 may include a result register capable of storing a particular number of bits, e.g., 64 bits. If the result of the multiplication of index 144 by size 146 is greater than 64 bits, then an overflow condition occurs and the most-significant bits of the result beyond the 64th bit are truncated, resulting in result 135 including only the 64 least-significant bits. Arithmetic logic circuit 130, in response to the occurrence of the overflow condition, asserts overflow signal 137, thereby indicating the overflow of the multiplication result.

In some embodiments, the first corrective action may include generation of an exception that prevents the instance of the instruction from completing. For example, the assertion of overflow signal 137 may cause an exception handler circuit in processor circuit 101 to stall processing of remaining instruction instances 125, including further processing of instruction instance 125*a*, and instead fetch and process instructions associated with the exception. Such an exception handler may be configured to fetch instructions from different predetermined locations based on a source of the exception signal. Accordingly, overflow signal 137 may trigger a particular set of instructions to be fetched or may set in motion a series of events that ultimately leads to the particular set of instructions being fetched.

In other embodiments, the first corrective action may include setting an indication of the overflow condition, such as overflow signal 137. A subsequent one of instruction instances 125 may then poll overflow signal 137 and, if asserted, cause execution pipeline 110 to skip one or more subsequent instructions that would otherwise cause an access to data array 175. Assertion of overflow signal 137 may, therefore, cause an access to data array 175 to be bypassed, thereby preventing a potentially misaligned access. Other corrective actions are contemplated, including an example described below in combination with FIG. 3.

Use of an instruction that identifies an overflow of an arithmetic operation, such as instruction instance 125*a*, may be used to mitigate a memory attack that relies on an overflow condition to generate a pointer to a data array that is misaligned to entries of the array. By detecting and flagging such an overflow condition, use of the misaligned pointer may be preempted.

It is noted that system 100, as illustrated in FIG. 1, is merely an example. The illustration of FIG. 1 has been simplified to highlight features relevant to this disclosure. Various embodiments may include different configurations of the circuit elements. For example, a single execution pipeline is shown. In other embodiments, any suitable number of execution pipeline circuits may be included. Furthermore, execution pipeline 110 may include elements in addition to instruction buffer 120 and arithmetic logic circuit 130. Processor circuit 101 may also include additional elements such as instruction and data caches, translation lookaside buffers, fetch prediction circuits, and the like. In various embodiments, circuits of system 100, such as execution pipeline 110 and register circuits 140, may be implemented using any suitable combination of sequential and combinatorial logic circuits. In addition, register and/or memory circuits, such as SRAM, may be used in these circuits to temporarily hold information such as instructions, data, address values, and the like.

Figure 2:
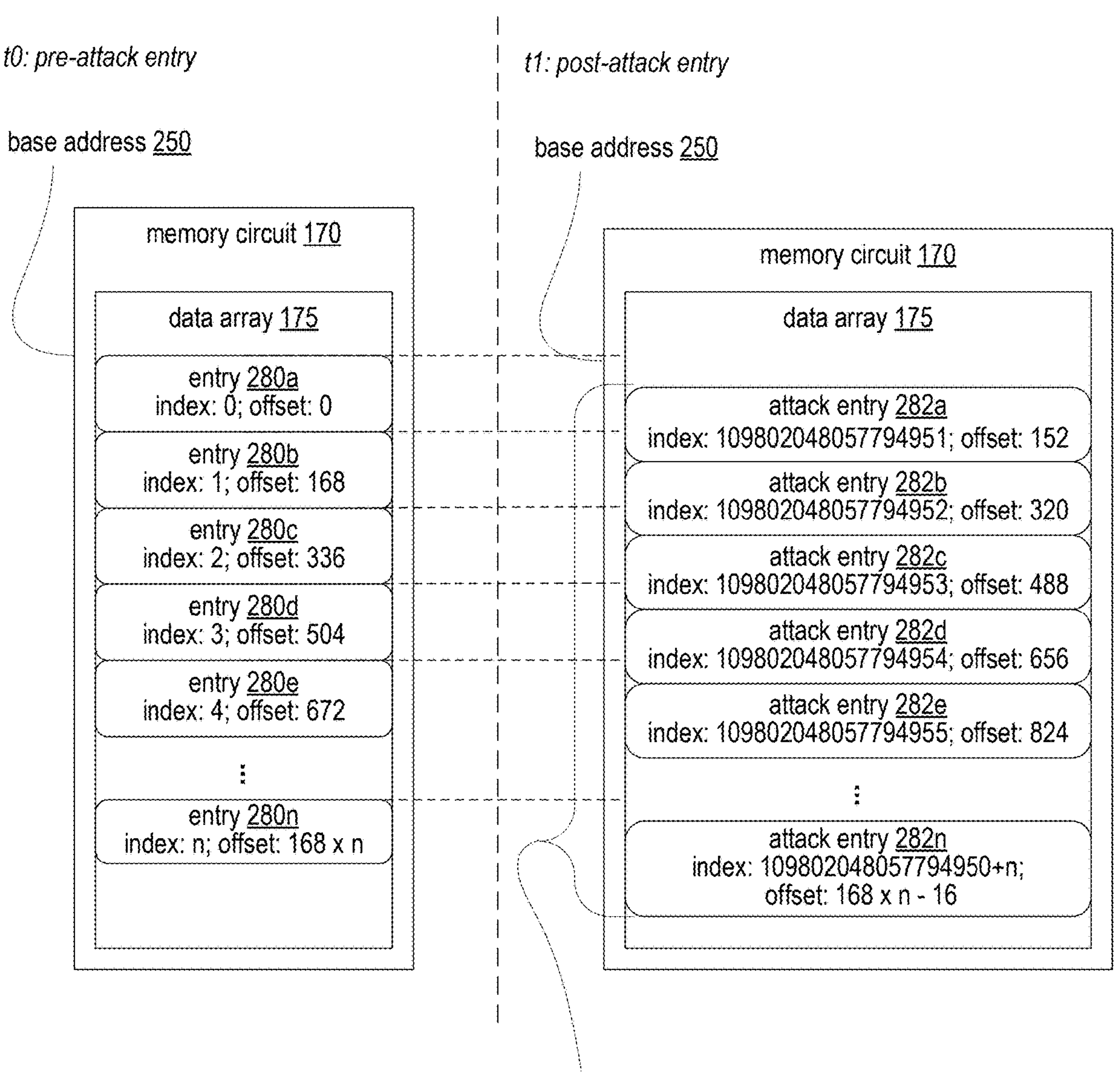
FIG. 2 shows a block diagram of an embodiment of a memory circuit of the system of FIG. 1 at two points in time.

FIG. 1 depicts use of an instruction that identifies an overflow condition that occurs after an arithmetic operation involving operands of the instruction. As disclosed above, use of such an instruction may help to avoid memory attacks on a computer system. FIG. 2 illustrates how such a memory attack may be performed when the disclosed instruction is not utilized. Moving to FIG. 2, the memory circuit of the system of FIG. 1 is shown at two points in time, before a memory attack and after a memory attack.

At time t0, as shown, data array 175 has been written to memory circuit 170. In various embodiments, processor circuit 101, a different processing circuit in system 100, or a combination thereof may execute one or more memory transactions that cause data array 175 to be stored in memory circuit 170. As depicted, data array 175 includes entries 280*a*-280*n* (collectively 280), with each entry having an associated index value and offset value. The index value may correspond to a sequence of a respective one of entries 280. The offset value may correspond to an address offset from base address 250, e.g., a first address of data array 175. For example, the first entry 280*a*, has an index of 0 and an offset of 0, thereby indicating that addresses for entry 280*a* start at base address 250. Entry 280*b* has an index of 1 and an offset of 168, indicating a first address of entry 280*b* is at base address 250 plus the offset of 168. It is noted that the index increments by one for each subsequent entry 280 and the offset increments by 168, indicating that a size of each of entries 280 is 168. Accordingly, a starting address for a particular entry may be calculated by multiplying the index of the particular entry by the size of 168 and adding the multiplication result to base address 250.

Execution pipeline 110 of FIG. 1 may execute an instance of a different instruction in the ISA executable to compute an address for accessing data array 175 in memory circuit 170 of system 100. Like instruction instance 125*a* of FIG. 1, this different instruction may also specify a set of operands, including an index value and a size value. In some embodiments, a base address pointer value may be included in the set of operands. As illustrated, execution of the instance of the different instruction includes performing a particular arithmetic operation that includes a multiplication of the index value and the size value to generate a multiplication result for the address. Unlike instruction instance 125*a*, the performing of the different instruction does not cause a first corrective action in response to the arithmetic operation generating an overflow condition.

Accordingly, a hacker may be capable of writing malware code that calls an API that includes an index value as an input. Instead of using a valid index value from 0 to n, the malware may use a very large index value that causes an overflow when multiplied by the size value. As shown, an index value of "109802048057794951" is used in a first API call. When multiplied by the size value of 168 and truncated to a 64-bit value, the multiplication result produces an offset value of 152. When added to base address 250, an address pointer is generated that falls between the starting addresses of entries 280*a* and 280*b*, and is therefore, misaligned with entries 280.

Such malware code may proceed, as shown, to increment the oversized index value thereby generating a series of attack entries 282*a*-282*n*. If the API stores values into data array 175 using these misaligned attack entries 282*a*-282*n*, then the original entries 280*a*-280*n* may be corrupted. A subsequent access to data array 175 by a legitimate program being executed in system 100 may use a properly generated aligned address pointer to read a corrupted one of entries 280, possibly resulting in unexpected behavior by system 100 that allows the malware to gain access to memory locations it should not be permitted to access, and/or giving the malware control of system 100.

It is noted that the embodiment of FIG. 2 is one example of how a memory attack may be performed. As previously described, the elements included in FIG. 2 are limited for clarity. Values used in the illustrated example are for demonstrating an example attack. Use of other values to generate attack entries 282*a*-282*n* is contemplated.

Figure 3:
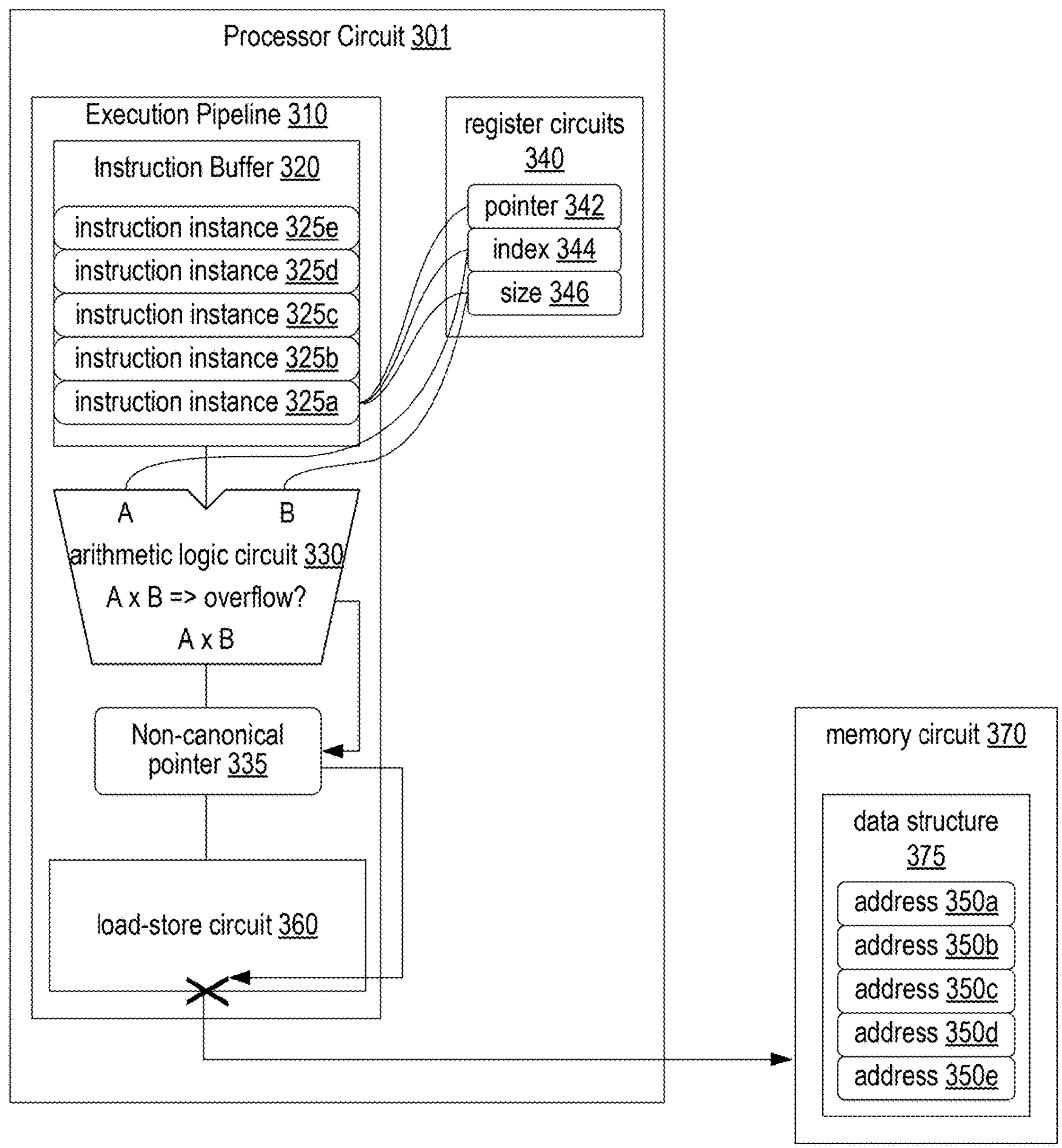
FIG. 3 depicts a block diagram of an embodiment of another system that includes an execution pipeline that supports canonical pointers.

Turning to FIG. 3, another system including a memory circuit and a processor circuit configured to perform an instruction that detects overflow conditions after an arithmetic operation is performed is depicted. In a similar manner to system 100 of FIG. 1, system 300 includes processor circuit 301 and memory circuit 370. Elements of system 300 may correspond to the descriptions of similarly named and numbered elements of system 100, with exceptions as described below.

As illustrated, processor circuit 301 may be configured to receive a first instance of a particular instruction (e.g., instruction instance 325*a*) that is executable to determine a pointer to one of addresses 350*a*-350*e* included in data structure 375 in memory circuit 370. Instruction instance 325*a* may specify a set of operands that includes a base address value (pointer 342), an index value (index 344), and a size value (size 346). In response to an execution of instruction instance 325*a*, processor circuit 301 (e.g., using arithmetic logic circuit 330) may be further configured to perform an arithmetic operation that includes a multiplication of index 344 and size 346 to generate a multiplication result for the pointer. In response to the arithmetic operation generating an overflow condition (such as described above in regard to FIG. 2), processor circuit 301 may be further configured to cause a first corrective action that prevents access to data structure 375.

Processor circuit 301, as shown, may be further configured to utilize a canonical format for pointers. Such a canonical format may include a particular number of bits in which a first proper subset of the particular number of bits are used for indicating that a second proper subset of the particular number of bits, exclusive of the first proper subset, correspond to a pointer value. For example, pointer values may use a 64-bit format, with four bits (e.g., the four most-significant bits) used as a pointer tag. This pointer tag may be a particular value (e.g., "0000" or "1111" or "1010") to indicate that the remaining 60 bits are intended to be used as a valid address pointer. A value that is used as a pointer that has a valid tag value is considered a "canonical" pointer. If a value that does not have a valid tag value in the four most-significant bits is used as a pointer, then that value is considered a "non-canonical" pointer and may be treated differently than a canonical pointer.

To cause the first corrective action, processor circuit 301 may be further configured to generate, as a result of instruction instance 325*a*, a result pointer value having a non-canonical format (e.g., non-canonical pointer 335). Processor circuit 301 may also be configured to execute a subsequent instance of an instruction within the instruction stream (e.g., instruction instance 325*b*). Instruction instance 325*b* may specify the result pointer value (non-canonical pointer 335) as an operand. In response to the result pointer value having the non-canonical format, processor circuit 301 may be further configured to cause a second corrective action that prevents access to the data structure. To cause the second corrective action, processor circuit 301 may be further configured to generate an exception that prevents instruction instance 325*b* from completing.

For example, the generated exception may direct processor circuit 301 to fetch a particular exception service routine that is executable to determine a source for the operands used to generate the non-canonical pointer value. In some cases, instruction instance 325*a* may be included in an API that is available to be called by active applications. The particular exception service routine may identify a given application that called this API using these operands. Various actions may be taken to prevent further execution of the identified application, such as idling and/or deleting the application.

In some embodiments, instruction instance 325*a* may be a store instruction that causes the arithmetic operation. In other embodiments, instruction instance 325*a* may be a load instruction that causes the arithmetic operation. In such embodiments, the non-canonical pointer may be generated and used in the same instruction, with the attempted use of the non-canonical pointer causing the exception, thereby preventing the store or load instruction from completing the access to memory.

It is noted that the system of FIG. 3 is merely an example. Similar to FIG. 1, FIG. 3 has been simplified to highlight features relevant to this disclosure. Various embodiments may include different configurations of the circuit elements. For example, a single execution pipeline is shown. In other embodiments, any suitable number of execution pipeline circuits may be included. Furthermore, execution pipeline 310 may include elements in addition to instruction buffer 320, arithmetic logic circuit 330, and load-store circuit 360. Processor circuit 101 may also include additional elements such as instruction and data caches, translation lookaside buffers, fetch prediction circuits, and the like. In various embodiments, circuits of system 300, such as execution pipeline 310 and register circuits 340 may be implemented using any suitable combination of sequential and combinatorial logic circuits. In addition, register and/or memory circuits, such as SRAM, may be used in these circuits to temporarily hold information such as instructions, data, address values, and the like.

To summarize, various embodiments of an apparatus may include a processor circuit that includes an execution pipeline circuit configured to execute instructions within an instruction stream, including a first instance of an instruction executable to compute an address to access a data array in a computer memory. The first instance of the instruction may specify a set of operands that includes a pointer value to a base address of the data array, a first scalar value that corresponds to an index into the data array, and a second scalar value that corresponds to a size of data elements within the data array. In response to receiving the first instance of the instruction, the execution pipeline circuit may be configured to perform an arithmetic operation that includes a multiplication of the index and the size to generate a multiplication result for the address. In response to the arithmetic operation generating an overflow condition, the execution pipeline circuit may be further configured to cause a first corrective action that prevents access to the data array.

In a further example, to specify the set of operands, the instruction may be defined to encode one or more identifiers of respective registers containing ones of the set of operands. In another example, the data array may be defined as a multidimensional array.

In an example, the execution pipeline circuit may be further configured to, in response to the overflow condition, assert an overflow signal. The processor circuit may be further configured to generate a particular exception that prevents the instance of the instruction from completing. In another example, to prevent the instance of the instruction from completing, the processor circuit may be further configured to stall further processing of the instructions within the instruction stream, and to fetch and process instructions associated with the particular exception.

The circuits and techniques described above in regards to FIGS. 1-3 may perform a particular instruction using a variety of methods. Two methods associated with performing an instruction capable of detecting an overflow condition are described below in combination with FIGS. 4 and 5. In some embodiments, the operations of the disclosed methods may be performed using instructions included in a non-transient, computer-readable memory having program instructions being executable by processor circuits in the systems to cause the operations described with reference to FIGS. 4 and 5.

Moving now to FIG. 4, a flow diagram for an embodiment of a method for performing, by a processor circuit, an instruction capable of detecting an overflow condition is shown. Method 400 may be performed by a system, such as systems 100 and 300 in FIGS. 1-3. Method 400 is described below using system 100 of FIG. 1 as an example. References to elements in FIG. 1 are included as non-limiting examples.

Method 400 begins at block 410 with an execution pipeline circuit of a processor circuit of a computer system having an ISA (e.g., processor circuit 101) executing an instance of an instruction (e.g., instruction instance 125*a*) in the ISA executable to compute an address for accessing data array 175 in memory circuit 170 of system 100. As shown in FIG. 1, instruction instance 125*a* is within an instruction stream (e.g., instruction instances 125 in instruction buffer 120) and specifies a set of operands that includes a pointer value to a base address of the data array (pointer 142), a first scalar value that corresponds to an index into the data array (index 144), and a second scalar value that corresponds to a size of data elements within the data array size (146).

As illustrated, execution of instruction instance 125*a* at block 415 of method 400 includes performing, at block 420, an arithmetic operation that includes a multiplication of index 144 and size 146 to generate a multiplication result for the address. For example, in some embodiments, instruction instance 125*a* may be a multiply-add instruction in which the arithmetic operation includes adding the result of the multiplication of index 144 and size 146 to pointer 142. In other embodiments, instruction instance 125*a* may be a multiply-subtract instruction in which the arithmetic operation includes subtracting the result of the multiplication of index 144 and size 146 from pointer 142.

Execution of instruction instance 125*a* in method 400 further includes, at block 430, causing a first corrective action in response to the arithmetic operation generating an overflow condition, the corrective action preventing access to data array 175. In some embodiments, the first corrective action includes generation of an exception that prevents instruction instance 125*a* from completing. In some cases, the overflow condition may indicate an overflow of the multiplication result. In other cases, the overflow condition may indicate an overflow caused by using the multiplication result to complete the arithmetic operation, e.g., by adding the result to pointer 142.

In some embodiments, an instance of a different instruction in the ISA may also be executable to compute an address for accessing a particular data array in a memory of the computer system. Such a different instruction may also specify the same set of operands as instruction instance 125*a*, including pointer 142, index 144, and size 146. Executing this instance of the different instruction may include performing a particular arithmetic operation that includes a multiplication of index 144 and size 146 to generate a multiplication result for the address. In contrast to instruction instance 125*a*, performing the instance of the different instruction does not cause the first corrective action in response to the arithmetic operation generating an overflow condition. For example, the different instruction may be a traditional multiply-add (or multiply-subtract) instruction such as may be included in certain ISAs. The disclosed instruction may, therefore, be an additional instruction added to such ISAs to increase a capability of identifying and mitigating hacking attempts.

It is noted that the method of FIG. 4 includes blocks 410-430. Method 400 may end in block 430 or may repeat some or all blocks of the method. For example, method 400 may repeat in response to receiving another instance of the instruction. Method 400 may be performed concurrently with a different instance of method 400. For example, processor circuit 101 may include a plurality of execution pipelines, each capable of executing a respective instance of the disclosed instruction in an overlapping manner.

Turning now to FIG. 5, a flow diagram for an embodiment of a method for performing, by a processor circuit, an instruction capable of detecting canonical and non-canonical pointers is illustrated. In a similar manner to method 400, method 500 may be performed by a system, such as systems 100 and 300 in FIGS. 1-3. Method 500 is described below using system 300 of FIG. as an example. References to elements in FIG. 3 are included as non-limiting examples. Method 500 may correspond to block 430 of method 400. Accordingly, method 500 may begin with execution pipeline 310 having performed the arithmetic operation in block 420, including the multiplication of index 344 and size 346.

At block 510, method 500 begins with execution pipeline 310 generating, for a first corrective action as a result of instruction instance 325*a*, a result pointer value having a non-canonical format. As disclosed above in regard to FIG. 3, a canonical format may include a particular number of bits in which a first portion of the bits are used for indicating that a second, non-overlapping, portion of the bits correspond to a valid pointer value. For example, a given address pointer value may include 64 bits, with eight bits corresponding to the first portion and the remaining 56 bits corresponding to the second portion. A particular value of the first portion (e.g., 0b01010101 or 0b11110000) may be used to indicate that the remaining 56 bits are a valid pointer value. If the first portion does not have the particular value, then the result pointer value is non-canonical.

Method 500 continues at block 520 with execution pipeline 310, in response to the result pointer value with the non-canonical format being supplied as an operand to a subsequent instruction instance 325*b* within instruction instances 325, causing a second corrective action that prevents access to data structure 375. For example, instruction instance 325*a* may be an instance of a multiple-add instruction, the result of which is used by instruction instance 325*b* (or 325*c*, or 325*d*, etc.) as an address pointer to data structure 375. The attempted use of the non-canonical pointer value may trigger the second corrective action described next at block 530.

At block 530, method 500 continues with execution pipeline 310 generating, for the second corrective action, an exception that prevents instruction instance 325*b* from completing. In some embodiments, for example, the generating exception may be reserved for use in response to attempts to use non-canonical pointers. The generated exception may direct processor circuit 301 to fetch a particular exception service routine that is executable to prevent further execution of a program thread associated with the operands that resulted in the generation of the non-canonical address pointer. For example, an anti-virus and/or anti-malware program may be activated to determine if the associated program thread includes characteristics of a known type of virus/malware.

It is noted that the method of FIG. 5 includes blocks 510-530. Method 500 may end in block 530, or may repeat some or all operations. For example, method 500 may repeat in response to another instance of the instruction resulting in a non-canonical pointer value. Method 500, similar to method 400, may be performed concurrently with a different instance of methods 400 and/or 500.

Figure 6:
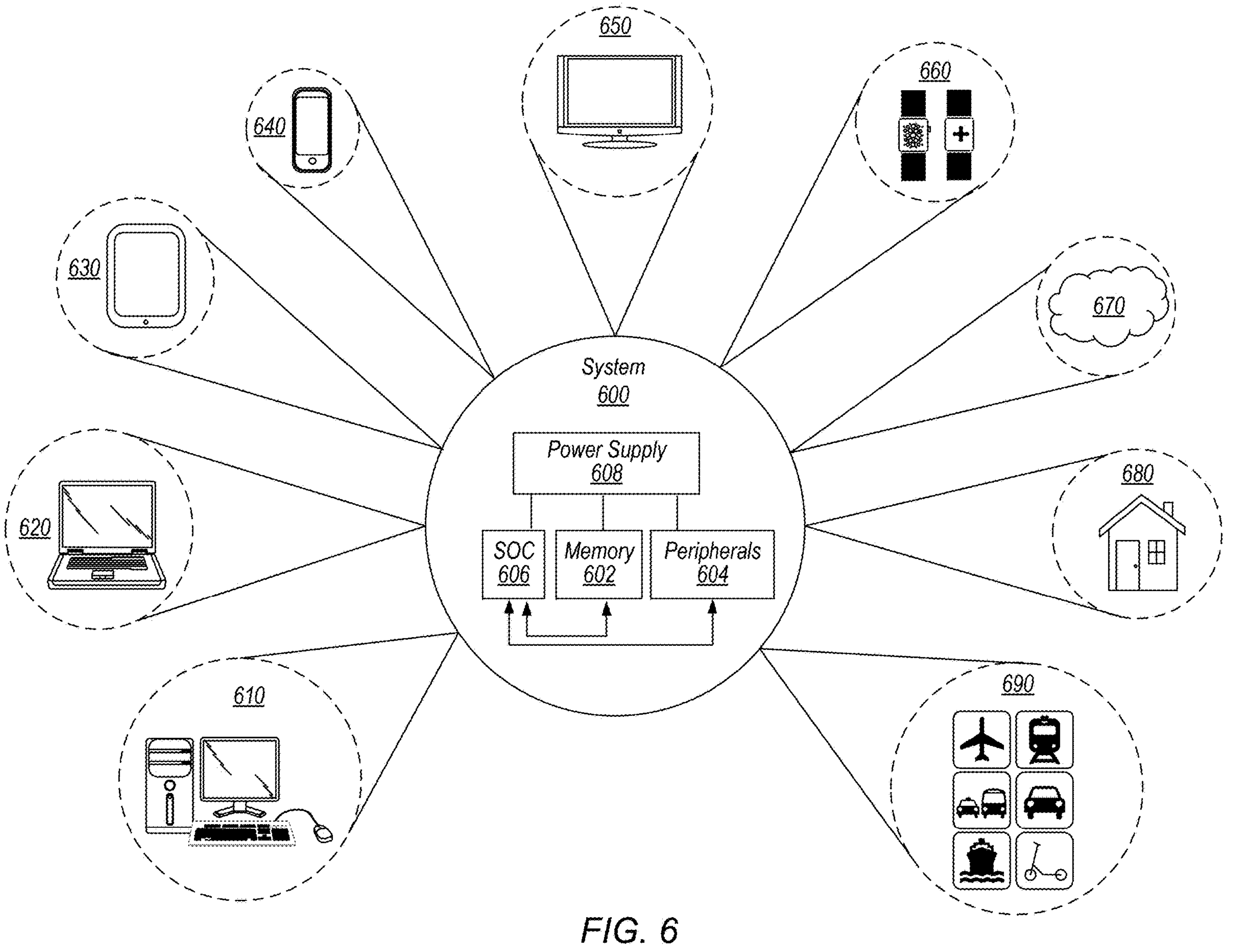
FIG. 6 illustrates various embodiments of systems that include coupled integrated circuits.

FIGS. 1-5 illustrate circuits and methods for a system, such as an SOC, that includes an execution pipeline capable of executing an instruction capable of detecting an overflow condition during pointer arithmetic. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SOC) or other type of integrated circuit, including multi-die packages. A block diagram illustrating an embodiment of system 600 is illustrated in FIG. 6. System 600 may, in some embodiments, include any disclosed embodiment of systems disclosed herein, such as systems 100 and 300 shown in FIGS. 1-3.

In the illustrated embodiment, the system 600 includes at least one instance of a system on chip (SOC) 606 which may include multiple types of processor circuits, such as a central processing unit (CPU), a graphics processing unit (GPU), or otherwise, a communication fabric, and interfaces to memories and input/output devices. SOC 606 may correspond to an instance of the processor circuits and/or systems disclosed herein. In various embodiments, SOC 606 is coupled to external memory circuit 602, peripherals 604, and power supply 608.

A power supply 608 is also provided which supplies the supply voltages to SOC 606 as well as one or more supply voltages to external memory circuit 602 and/or the peripherals 604. In various embodiments, power supply 608 represents a battery (e.g., a rechargeable battery in a smart phone, laptop or tablet computer, or other device). In some embodiments, more than one instance of SOC 606 is included (and more than one external memory circuit 602 is included as well.

External memory circuit 602 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 602 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SOC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 660 are contemplated as well, such as devices worn around the neck, devices attached to hats or other headgear, devices that are implantable in the human body, eyeglasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home 680 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation 690. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance (e.g., self-driving vehicles), general systems control, and otherwise.

It is noted that the wide variety of potential applications for system 600 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 6 are illustrative only and are not intended to be limiting. Other devices are possible and are contemplated.

As disclosed in regard to FIG. 6, system 600 may include one or more integrated circuits included within a personal computer, smart phone, tablet computer, or other type of computing device. A process for designing and producing an integrated circuit using design information is presented below in FIG. 7.

Figure 7:
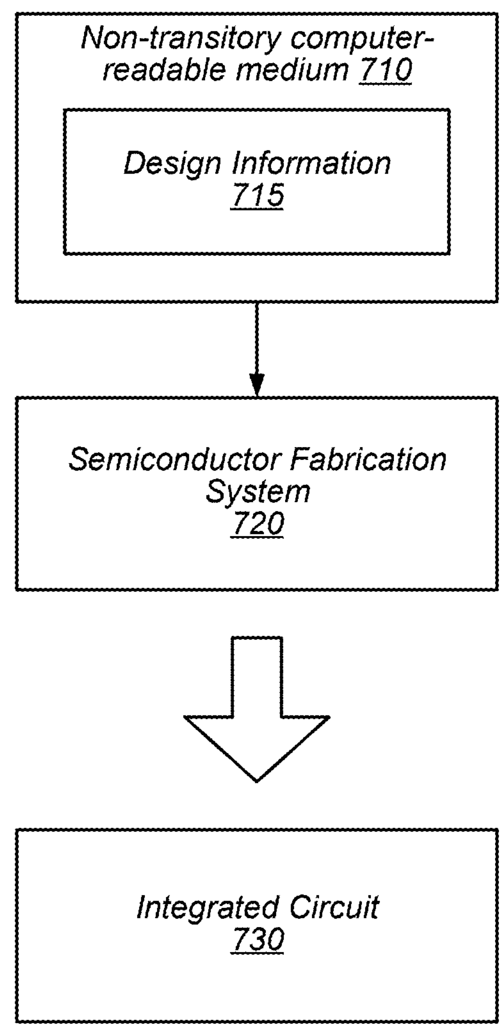
FIG. 7 depicts a block diagram of an example computer-readable medium, according to some embodiments.

FIG. 7 is a block diagram illustrating an example of a non-transitory computer-readable storage medium that stores circuit design information, according to some embodiments. The embodiment of FIG. 7 may be utilized in a process to design and manufacture integrated circuits, for example, including one or more instances of systems (or portions thereof) 100 and 300 that are disclosed above. In the illustrated embodiment, semiconductor fabrication system 720 is configured to process the design information 715 stored on non-transitory computer-readable storage medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system, such as semiconductor fabrication system 720, for example. In some embodiments, design information 715 may include a netlist that specifies elements of a cell library, as well as their connectivity. One or more cell libraries used during logic synthesis of circuits included in integrated circuit 730 may also be included in design information 715. Such cell libraries may include information indicative of device or transistor level netlists, mask design data, characterization data, and the like, of cells included in the cell library.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown or described herein. Further, integrated circuit 730 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a processor circuit that includes an execution pipeline circuit configured to execute instructions within an instruction stream, including a first instance of an instruction executable to compute an address to access a data array in a computer memory, the first instance of the instruction specifying a set of operands that includes a pointer value to a base address of the data array, a first scalar value that corresponds to an index into the data array, and a second scalar value that corresponds to a size of data elements within the data array, wherein, in response to receiving the first instance of the instruction, the execution pipeline circuit is configured to:

perform an arithmetic operation that includes a multiplication of the index and the size to generate a multiplication result for the address; and in response to the arithmetic operation generating an overflow condition, cause a first corrective action that prevents completion of a subsequent instruction that identifies the multiplication result as an operand.

2. The apparatus of claim 1, wherein to specify the set of operands, the instruction is defined to encode one or more identifiers of respective registers containing ones of the set of operands.

3. The apparatus of claim 1, wherein the data array is defined as a multidimensional array.

4. The apparatus of claim 1, wherein the execution pipeline circuit is configured to:

in response to the overflow condition, assert an overflow signal; and wherein the processor circuit is configured to:

generate a particular exception that prevents the first instance of the instruction from completing.

5. The apparatus of claim 4, wherein to prevent the first instance of the instruction from completing, the processor circuit is further configured to:

stall further processing of the instructions within the instruction stream; and fetch and process instructions associated with the particular exception.

6. A method, comprising:

executing, by an execution pipeline circuit of a processor circuit of a computer system having an instruction set architecture (ISA), an instance of an instruction in the ISA executable to compute an address for accessing a data array in a memory of the computer system, the instruction being within an instruction stream and specifying a set of operands that includes a pointer value to a base address of the data array, a first scalar value that corresponds to an index into the data array, and a second scalar value that corresponds to a size of data elements within the data array, wherein execution of the instance of the instruction includes:

performing an arithmetic operation that includes a multiplication of the index and the size to generate a multiplication result for the address; and causing a first corrective action in response to the arithmetic operation generating an overflow condition, the first corrective action preventing completion of a subsequent instance of an instruction that uses the multiplication result as an operand.

7. The method of claim 6, wherein the first corrective action includes generation of an exception that prevents the instance of the instruction from completing.

8. The method of claim 6, wherein the overflow condition indicates an overflow of the multiplication result.

9. The method of claim 6, wherein the overflow condition indicates an overflow caused by using the multiplication result to complete the arithmetic operation.

10. The method of claim 6, wherein the first corrective action includes generating, as a result of the instruction, a result pointer value having a non-canonical format, the method further comprising:

in response to the result pointer value with the non-canonical format being supplied as an operand to the subsequent instance of the instruction within the instruction stream, causing a second corrective action that prevents access to the data array.

11. The method of claim 10, wherein the second corrective action includes generation of an exception that prevents the subsequent instance of the instruction from completing.

12. The method of claim 6, wherein the instruction is a multiply-add instruction, and wherein the arithmetic operation includes adding the multiplication result to the pointer value.

13. The method of claim 6, wherein the instruction is a multiply-subtract instruction, and wherein the arithmetic operation includes subtracting the multiplication result from the pointer value.

14. The method of claim 6, further comprising:

executing an instance of a different instruction in the ISA executable to compute the address for accessing the data array, the different instruction also specifying operands that include the set of operands, wherein execution of the instance of the different instruction includes:

performing a particular arithmetic operation that includes multiplication of the index and size to generate a multiplication result for the address, wherein the performing does not cause the first corrective action in response to the arithmetic operation generating an overflow condition.

15. A system comprising:

a memory circuit;

a processor circuit configured to:

receive a first instance of a particular instruction executable to determine a pointer to a data structure in the memory circuit, wherein the first instance of the particular instruction specifies a set of operands that includes a base address value, an index value, and a size value;

in response to an execution of the first instance, perform an arithmetic operation that includes a multiplication of the index value and the size value to generate a multiplication result for the pointer; and in response to the arithmetic operation generating an overflow condition, cause a first corrective action that prevents completion of a subsequent instruction that identifies the multiplication result as an operand.

16. The system of claim 15, wherein the processor circuit is further configured to utilize a canonical format for pointers, wherein the canonical format includes a particular number of bits in which a first proper subset of the particular number of bits are used for indicating that a second proper subset of the particular number of bits, exclusive of the first proper subset, correspond to a pointer value.

17. The system of claim 16, wherein to cause the first corrective action, the processor circuit is further configured to:

generate, as a result of the particular instruction, a result pointer value having a non-canonical format;

execute a subsequent instance of an instruction within an instruction stream, wherein the subsequent instance of the instruction specifies the result pointer value as an operand; and in response to the result pointer value having the non-canonical format, cause a second corrective action that prevents access to the data structure.

18. The system of claim 17, wherein to cause the second corrective action, the processor circuit is further configured to generate an exception that prevents the subsequent instance of the instruction from completing.

19. The system of claim 15, wherein the particular instruction is a store instruction that causes the arithmetic operation.

20. The system of claim 15, wherein the particular instruction is a load instruction that causes the arithmetic operation.

* * * * *